(12) United States Patent
Bermúdez

(10) Patent No.: US 6,388,182 B1
(45) Date of Patent: May 14, 2002

(54) METHOD AND APPARATUS FOR TEACHING MUSIC

(76) Inventor: Renée Francesca Bermúdez, 3212 W. Cabot Dr. #2, Anaheim, CA (US) 92804

( * ) Notice: Subject to any disclaimer, the term of this patent is extended or adjusted under 35 U.S.C. 154(b) by 0 days.

(21) Appl. No.: 09/813,005

(22) Filed: Mar. 21, 2001

(51) Int. Cl.[7] ............................................. G09B 15/02
(52) U.S. Cl. ..................... 84/477 R; 84/470 R; 84/478; 84/479 A; 84/483.1
(58) Field of Search ............................. 84/477 R, 478, 84/479 R, 479 A, 483.1, 470 R

(56) References Cited

U.S. PATENT DOCUMENTS

| | | |
|---|---|---|
| 25,657 A | 10/1859 | Mahoney |
| 41,043 A | 12/1863 | Winner |
| 566,388 A | 8/1896 | Eschemann |
| 608,771 A | 8/1898 | Guilford |
| 881,085 A | 3/1908 | Shires |
| 1,009,671 A | 11/1911 | Kraft |
| 1,133,074 A | 3/1915 | Unschuld-Lazard |
| 1,200,367 A | 10/1916 | Kinney |
| 1,473,495 A | 11/1923 | Miller |
| 3,331,271 A | 7/1967 | Glenn |
| 3,733,956 A | 5/1973 | Leonard |
| 3,741,066 A | 6/1973 | Cromleigh |
| 3,815,466 A | 6/1974 | Johnson |
| 3,822,630 A | 7/1974 | Leonard |
| 3,888,155 A | 6/1975 | Leonard |
| 3,890,875 A | 6/1975 | Leonard |
| 4,041,828 A | 8/1977 | Leonard |
| 4,480,521 A | * 11/1984 | Schmoyer ..................... 84/715 |
| 5,144,875 A | * 9/1992 | Nakada ....................... 84/611 |
| 5,574,242 A | 11/1996 | Bui |
| 5,841,051 A | * 11/1998 | Segan ...................... 84/477 R |
| 6,015,947 A | 1/2000 | Moberg |

* cited by examiner

*Primary Examiner*—Shih-Yung Hsieh
(74) *Attorney, Agent, or Firm*—Lawrence R. Franklin

(57) ABSTRACT

A music teaching method utilizes a musical notation sheet to depict a song and a keyboard for playing the song. The notation sheet has a staff having a single line with numbers printed above and below the line. The numbers correspond to both the fingers of the hands (1–5 from thumb to pinkie) and ten consecutive white keys on a keyboard. Suitable symbols indicate both hands and keyboard. The student is directed to place the hands on the keyboard with the each numbered finger on the same numbered key and to depress that key when its number appears on the music sheet using the fingers of the left hand for the numbers below the staff line and the fingers of the right hand for the numbers above the staff line.

20 Claims, 6 Drawing Sheets

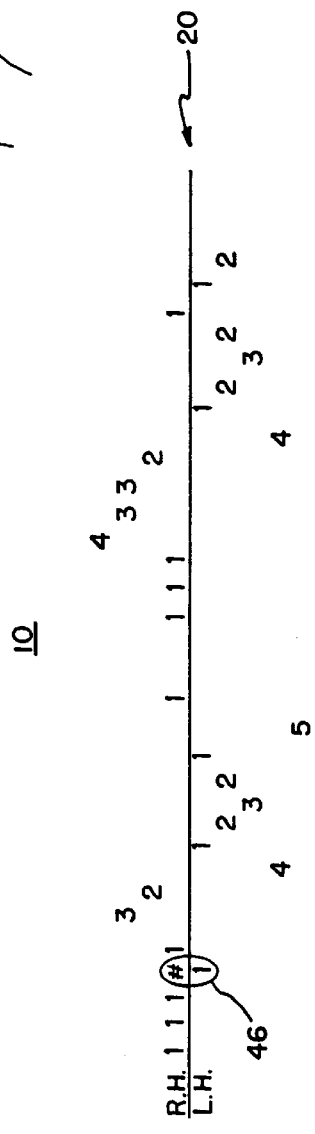
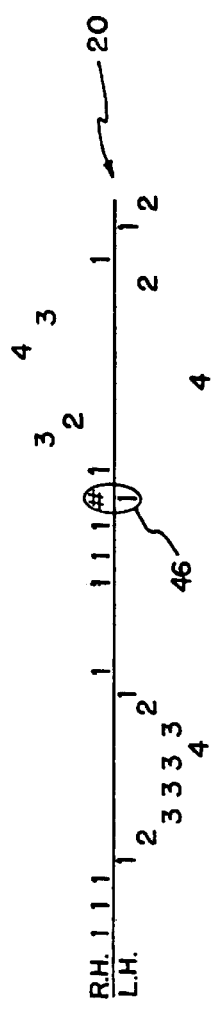
O LITTLE TOWN OF BETHLEHEM
FIG. 4

METHOD AND APPARATUS FOR TEACHING MUSIC

BACKGROUND OF THE INVENTION

1. Field of The Invention

This invention relates to a method and apparatus for teaching music to a musical novice and a novel music sheet for implementing the method. More specifically, it relates to a method for teaching the playing of a piano for introducing the world of music to people who have never played music before. It relates to a method of teaching a young child or other musical novice, including but not limited to people who are mentally or physically handicapped, who could benefit from successfully playing the piano virtually immediately, and who have no knowledge of musical instruments or of sheet music, how to read sheet music and to play the music written thereon on the keys of a keyboard instrument, particularly a piano.

2. Description of Related Art

The teaching of music is centuries old, as old as music itself. It is not surprising, therefore, to find elements of any novel teaching method in the prior art (much as one would find screws, nuts and bolts, cams, and gears as prior art of mechanical devices), most often in combinations too complex for introducing children to music.

The broad concept of writing music on a staff consisting of a single line is shown by Glenn (U.S. Pat. No. 3,331,271) in FIG. 1 and described in column 2, lines 54–57. However, the single line in Glenn comprises a reference line for a single octave with the notes of the octave being represented in both spaced relationship relative to the single line and by lines associated with each note. Glenn does not use the staff line to separate notes to be played by the left and right hands nor are her notes in the form of numbers corresponding to the fingers of the hands. Glenn also marks her keyboards for use with her notation system, but Glenn does not mark the keys with the notes themselves.

The broad concept of numbering the fingers and thumbs of the two hands by the numbers 1–5 is not novel. This is shown by Von Unshuld-Lazard (U.S. Pat. No. 1,133,074), Miller (U.S. Pat. No. 1,473,495), and Leonard (U.S. Pat. Nos. 3,733,956, 3,888,155, 3,890,875, and 4,041,828).

Von Unshuld-Lazard shows (FIG. 1) a staff 10 having characters 11 printed adjacent thereto, the characters 11, comprising the numbers 1, 2, and 3, and teaches (page 1, lines 90–100) that the numbers identify the fingers (thumb, index, and middle, respectively) which are to play the notes. Von Unshuld-Lazard also shows the numbers for the right hand printed above the staff and the numbers for the left hand printed below the staff. However, Von Unshuld-Lazard shows the conventional staff with conventional musical notes thereon and relates the numbers only to the notes to be played by the fingers designated by the characters 11. The notes per se are not identified with particular numbers, nor are the keys corresponding to the notes numbered; indeed, the depiction of the keys does not contain any numbers. As a result, the thumb, index finger, and middle finger (1, 2, and 3) are associated with different notes along the staff, since they play 1 5 different keys while ascending the scale.

Miller, like Von Unshuld-Lazard, labels each of the fingers with a number (page 2, lines 7–11) but does not label any single key or note with the same number. The notes are associated with a staff consisting of lines designating the black keys and spaces therebetween for designating the white keys.

Leonard (U.S. Pat. No. 3,733,956) discloses a slide rule for teaching music. Portions thereof which are related to this invention are particularly unclear, but the paragraph consisting of column 2, lines 17–29, suggests that the fingers of the right hand only are associated with the numbers 1–5. Like Miller and Von Unshuld-Lazard, Leonard does not label any single key or note with the same number. In addition to being limited to a slide rule, Leonard also lacks any teaching of a notation system including a staff associated with a portion of a piano keyboard.

Leonard (U.S. Pat. No. 3,888,155) shows a slide rule for teaching the playing of music to a very young child. The fingers of both hands are labeled (column 1, lines 25–26 and 65–66) from thumb to pinkie with the numbers 1–5, respectively. The slide rule associates a pictorial of a hand having these numbered fingers with the alphabetical note names of five consecutive notes which are to be played on five consecutive white keys on a piano keyboard (implied in column 2, lines 35–41 and FIG. 3); notes corresponding to the note names may or may not be printed on a staff. This association is done individually and separately for each hand; compare FIGS. 1 and 3. Music is written (FIG. 3) as a series of letters designating note names with numbers indicative of the fingers of one and only one of the hands printed adjacent the note names. The student is to play the note indicated by striking the key known to correspond thereto with the finger indicated by the number. Leonard further states: "One of the first things that a child must learn when beginning the study of music is basic keyboard fingering, which is generally taught by providing the student with simplified sheet music having the individual notes numbered in accordance with the numbering of the fingers used to play them." (Column 1, lines 5–10.) Thus, for each hand individually and exclusively of the other, Leonard numbers the fingers, associates the finger numbers with a set of note names (and possibly notes on a staff), and provides a music sheet having the numbers and note names printed sequentially therealong. As such, Leonard ('155) is essentially a music system for only one hand at a time with no means for coordinating both together. The invention disclosed and claimed herein differs in many respects: Leonard does not number the keys of a keyboard, but rather relies on the child to identify the key from a prior knowledge of the correspondence between note name and key. Leonard does not provide a music sheet which teaches the use of both hands simultaneously. And, she does not teach a single-lined staff having numbers, exclusively, positioned on the staff which show not only which key is to be struck and which finger is to be used, but also which hand has the finger in question.

Leonard (U.S. Pat. No. 3,890,875) shows a slide rule for teaching the relationship between notes, note names, and the corresponding keys on a piano keyboard. FIG. 1 shows left and right hands numbered from thumb to pinkie with the numbers 1–5, respectively, but the text does not indicate a use for the display other than to represent which hand (usually) plays which octaves of a piano keyboard. Leonard does not show a single lined staff, nor does she number the keys of the keyboard.

Leonard (U.S. Pat. No. 4,041,828) shows a slide rule for teaching scales and chords. Of interest is the numbering of the fingers of the left and right hands from thumb to pinkie with the numbers 1–5, respectively. The numbers show which finger is to be used to play the note of the scale or chord on the keyboard; see column 1, lines 39–45, and column 3, lines 6–10. Leonard states that so numbering the fingers is according to "conventional elementary music teaching techniques" (column 3, line 18) and represents "the proper numbering of the fingers" (column 3, lines 20–21). However, only the fingers are numbered. The keys, in particular, are not, as shown in FIG. 1, for instance, by the note C being played by both finger 5 or 2, depending on which scale or chord is being considered. Leonard does not show a single lined staff, nor does she number the keys of the keyboard.

The broad concept of displaying notes as numbers on a staff on a piece of sheet music, specifically including the numbers 1–5 among others, is not novel. This is shown by Eschemann (U.S. Pat. No. 566,388) and Guilford (U.S. Pat. No. 608,771).

Eschemann shows a diagram of a keyboard including permanent designations of the seven natural notes of the C-Major scale (C-B) of each octave (the white keys) in the form of the numbers 1–7 printed in solid lines and the five accidentals (the black keys) in the form of the number of the note sharped or flatted printed in dashed lines. The diagram is placed beneath the strings of an autoharp. There is no relationship of the numbers to any staff nor to the fingers of the player.

Guilford also permanently designates the chromatic notes of the C-Major scale (C-B) of each octave, in his case consecutively with the numbers 1–12. The notes are not associated with staff lines nor with the fingers which play them.

Shires (U.S. Pat. No. 881,085) discloses a musical notation system which appears to comprise numbers as notes with words printed alongside. A close reading, however, shows that the words constitute the notes and the numbers indicate the time value of the notes. Shires also differs by displaying the notation system on a standard, five line staff.

The teaching methods and apparatuses disclosed in these patents, and all other publications known to the inventor do not anticipate nor render obvious, singly nor in combination, the invention disclosed and claimed below, largely due to the many differences enumerated above, but primarily due to the lack of any teaching of the integrating concepts of the instant invention. Most of the teaching in the prior art are too complex for a young mind, to grasp, especially those unfamiliar with musical terms and practices.

The remaining references are cited for their showings of interesting features which are only marginally related to the instant invention.

OBJECTS AND SUMMARY OF THE INVENTION

The present invention overcomes the difficulties described above by providing a novel teaching method utilizing a novel music sheet comprising: (1) identifying the fingers of both hands and the corresponding keys to be played with those fingers with the same set of numbers, namely, the numbers 5, 4, 3, 2, and 1 for the fingers of the left hand and 1, 2, 3, 4, and for the fingers of the right hand, (2) providing a staff having a single line which divides the musical scale between notes played by the left and right hands, and (3) placing "notes" in the musical order of a musical composition on the staff, the "notes" being in the form of numbers, the same numbers which identify the keys and the fingers designated for playing the keys.

It is an object of the invention to provide a teaching method and music sheet which is easy to understand and use by people of all ages.

Another object of the invention is to provide a teaching method and music sheet by means of which a musical novice including a young child and the mentally or physically handicapped can find instant success in playing a piano.

Another object of the invention is to provide a teaching method and music sheet which associates the fingers of the hand with specific keys of a keyboard and with notes on a music sheet.

Another object of the invention is to provide a teaching method and music sheet in which the music sheet includes a staff comprising a single line which separates notes to be played with the right hand from notes to be played with the left hand.

Another object of the invention is to provide a teaching method and music sheet in which the music sheet further includes a diagram of the portion of the keyboard which includes the keys to be used in the playing of the notes of the musical composition printed on the staff.

Another object of the invention is to provide a teaching method in which the music sheet further includes the words of a song to be played.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which:

FIGS. 4–7 show various preferred embodiments of sheet music to be used in the inventive method.

DETAILED DESCRIPTION OF THE PREFERRED EMBODIMENT

Figure 1:
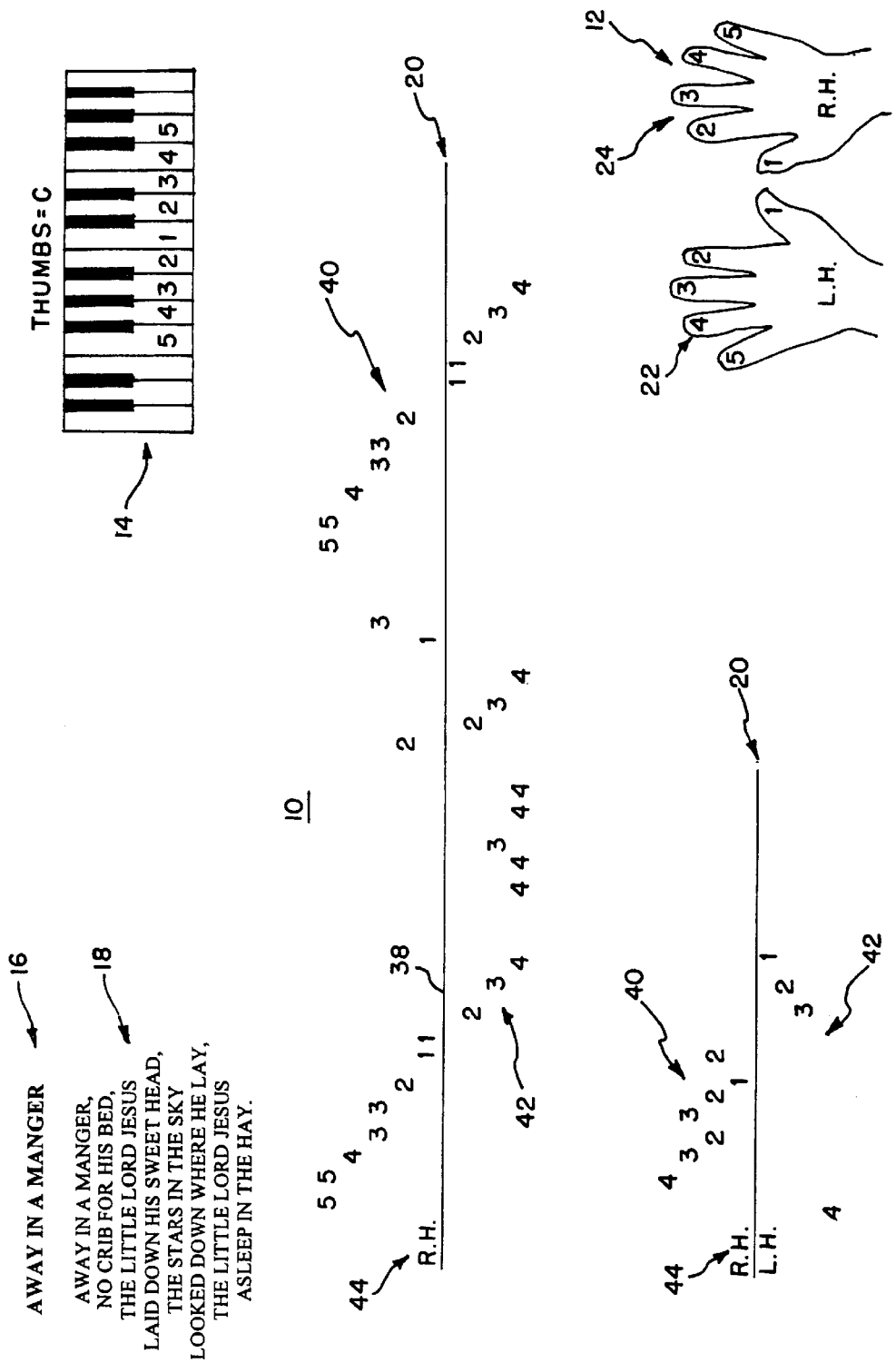
FIG. 1 shows an exemplary music sheet and depicts the basic elements involved in the music teaching method and apparatus.

Referring to FIG. 1, a preferred embodiment of a music sheet 10 is shown which includes the basic elements which participate in effecting the teaching method of the invention, namely, a depiction of a pair of hands 12 labelled according to the invention, a schematic diagram 14 comprising a pictorial representation of a portion of a keyboard, the title 16 and words 18 of a song, and a musical staff 20.

Figure 2:
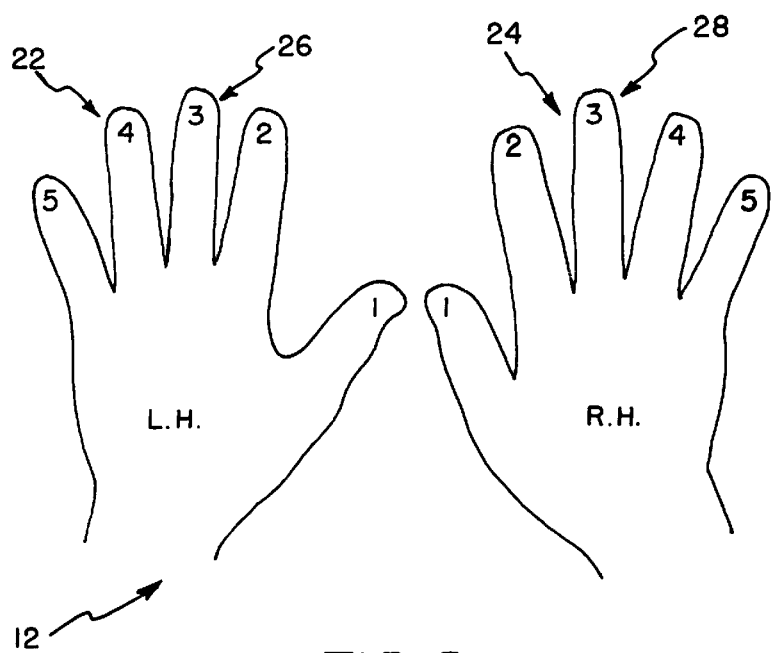
FIG. 2 shows a representation of a pair of hands with the fingers thereof numbered according to the invention.

Hands 12 are more clearly seen in FIG. 2 and, as is conventional, include a left hand 22 and a right hand 24. A distinctive name is assigned to each finger of the student's hands to readily identify each one. Preferably, each finger is represented by the numbers 1–5 printed on the fingers of hands 12. It is well known in the teaching of music to young children to name each finger of the left hand 22 with a group of numbers 26, namely, (from left to right) 5-4-3-2-1, and each finger of the right hand 24 with a similar group of numbers 28, the same numbers 1-2-3-4-5 but reversed in left-to-right order in accord with the mirror image of hands 22 and 24. Ten different numbers or ten different letters could as easily have been assigned to the ten fingers, e.g., 1–10 or A–J in any particular order, but young people find it easier to remember the finger's nomenclature, if the same number is assigned to corresponding fingers of both hands. As is shown in FIG. 2, both hands have assigned thereto numbers 26 and 28 as follows: "1" for the thumb, "2" for the index finger, "3" for the middle finger, "4" for the ring finger, and "5" for the little finger or pinkie. In the unfortunate circumstance of a student missing one or more fingers, it is contemplated to name those remaining with the numbers as designated above. Indicia "R.H." and "L.H." are imprinted on the depicted hands 22 and 26 as a reminder for the student that both hands are involved in the teaching method and to emphasize a unique association with musical staff 20 to be described shortly.

Figures 3A, 3B:
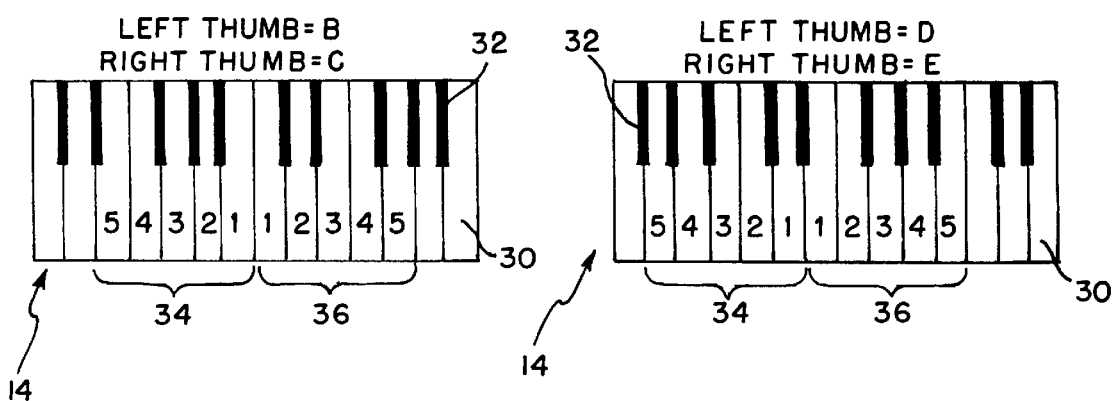
FIGS. 3A–3C show notations which orient the student to the keyboard and which appear with the music as written on the music sheet of FIG. 1.
Figure 3C:
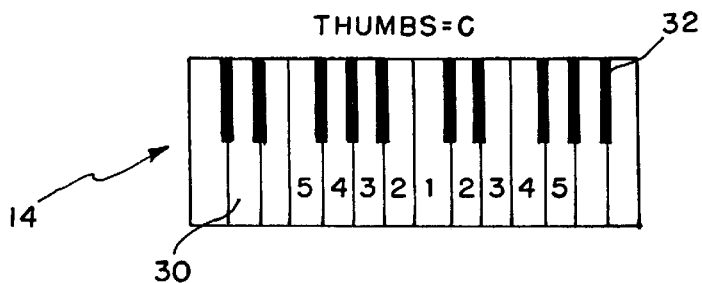

FIGS. 3A–3C illustrate three embodiments of diagram 14. Diagram 14 shows a portion of the keyboard of a keyboard instrument, typically a piano keyboard (not shown), accompanied by text directing the proper placement of each finger. The preferred type of keyboard depicted is the standard chromatic keyboard, each octave of which comprises seven white keys 30 and five black keys 32 arranged asymmetrically, as this type of keyboard is the one most commonly found on pianos, accordions, etc.. Because the representation is diagrammatic in nature depicting a portion of a known keyboard, however, it and the instant teaching method can obviously be adapted to any other known keyboard, e.g., the so-called uniform or Janko keyboard.

As shown in FIGS. 3A–3C, it is convenient for diagram 14 to include two octaves of the keyboard, but it must include a group of keys comprising at least ten white keys and their interlaced black keys. In the principal embodiment, ten consecutive white keys 30 have two sets of numbers 34 and 36 assigned to them. Numbers 34 and 36 are the same numbers 5-4-3-2-1 and 1-2-3-4-5 in the same left-to-right order as were the numbers 26 and 28, respectively, which are assigned to the left and right hands 22 and 24 in FIG. 2. The left-to-right orientation of the sets 34 and 36 along with the juxtapositioning of the "1" keys visually suggests to the student that sets 34 and 36 designate the keys 30 assigned to the left and right hands 22 and 24, respectively. The order of the numbers (5-4-3-2-1 and 1-2-3-4-5) within each set 34 and 36 reinforces the identification of them with the fingers of the student's left hand 22 and right hand 24, respectively.

FIG. 3C shows a variant of the teaching method in that both thumbs are assigned to the same key, the note middle C. It is customary in playing music on a piano for the bass clef notes (those below middle C) to be associated with the left hand and the treble clef notes (those above middle C) to be associated with the right hand. Numerous exceptions occur, of course, but as a general rule of thumb, the left half of the keyboard is assigned to the left hand and the right half to the right hand. Placing both the student's thumbs on middle C is a known technique for emphasizing that middle C is a reference key which divides the keyboard. It is a transition key which is associated with either hand.

An integral part of teaching a student to play a keyboard instrument is, of course, to provide him or her with an actual keyboard (not shown), referred herein for illustrative purposes as a piano keyboard. A particular pair of octaves corresponding to those shown in diagram 14 is selected from the eighty-eight keys which are standard on a piano, and the corresponding keys are labeled with the numbers of sets 34 and 36 as shown in diagram 14. It is preferred that numbers 34 and 36 be visible to the student. As such, number sets 34 and 36 are preferably removably affixed to the selected keys 30 by any convenient means, e.g., by means of easily removable decals with the numbers printed thereon or by printing numbers 34, 36 on one of the exposed faces of white keys 30 with an erasable marker, commercially known as a "dry erase marker." Either method presents the student with a visual guide for associating his or her fingers with the keys. For advanced students, number sets 34 and 36 can be mentally ascribed to the white keys 30, in which case they are not physically imprinted on the keys nor can they be visually seen. It is contra-indicated to permanently affix number sets 34, 36 on the keys. If the numbers were permanently a part of the keyboard, as this would limit the keyboard to one set of keys, an obvious disadvantage.

The selection of which set of ten keys of the eighty-eight available determines the octave and musical key of the song being played. The set is indicated by the placement of the thumbs, shown in FIGS. 1–3 as B–C, D–E, and C, respectively. When playing any given musical composition, the specific piano key corresponding to each note is a function of the musical key in which the composition is written. For teaching purposes, at least initially, the musical key in which the notes are written on music sheet 10 is chosen to minimize the number of sharps and/or flats, the so-called "accidentals", for the song being played, thereby minimizing the number of black keys 32 involved. As the student progresses, the same tune can be played on a different set of keys, requiring the music to be transposed, i.e., written in a correspondingly different musical key, in order to teach the concept of musical keys and their associated accidentals.

The instant teaching method instructs the student to place his or her hands on the piano keyboard with each numbered finger resting on the correspondingly numbered key. This establishes for the student the one-to-one relationship between the numbers 26 and 28 of the fingers and the numbers 34 and 36 of the keys upon which each finger rests. Music sheet 10 completes the association of notes, keys, and fingers. Sheet 10 tells the student the sequence of keys to depress in order to play a tune.

Returning to FIG. 1, music sheet 10 preferably includes the aforementiond diagrams of the pair of hands 12 and the portion of a keyboard 14, an identification of the song to be played, preferably by the title 16 and words 18, and a musical staff 20 with the notes of the song printed thereon.

It is assumed the child is familiar with the song being learned, in terms of the title 16, the words 18, and the musical timing or rhythm of the song. In the preferred embodiment shown in FIG. 1, both the title 16 and words 18, shown here as the popular Christmas song AWAY IN A MANGER, are printed on music sheet 10. This adds peripheral benefits for the student beyond the teaching of music. It will be recalled that the student to which the invention is primarily directed is very young, usually about four to ten years old. He or she may have no reading skills, or skills that are just budding. Printing the title and words on sheet music 10 acts as a teaching aid for learning to read. If the student can read but has difficulty remembering, or is mentally incapable of remembering, printing the words of the song on music sheet 10 helps to build a recollection and reinforcement of the words. It also helps to minimize the possibility of any embarrassment the student might feel from not knowing or remembering the words.

The physical component that pulls the teaching method together is the printed musical staff 20. Each staff 20 comprises a single horizontal line 38 extending transverse of music sheet 10. The two lines 38 shown in FIG. 1 designate two separate staffs, the lower being the continuation of the upper. Conceptually, line 38 separates the notes to be played by the right hand, printed as note names 40, from the notes to be played by the left hand, printed as note names 42, as the student is reminded by the indicia 44 "R.H./L.H." printed above/below staff line 38. The printing of "R.H." and "L.H." on hands 12 on the same sheet 10 and on staff 20 reinforces the idea that above-the-line belongs to the right hand 24 and below-the-line belongs to the left hand 22. This seemingly simple concept has apparently eluded music teachers for centuries, for it has not appeared in any publications known to the inventor. Yet its simplicity is instrumental in allowing the student the gratifying success of immediately playing the piano, for it is readily grasped by the young mind.

Note names 40 and 42 are written as numbers 1–5. Numbers 40 above line 38 on music sheet 10 have a one-to-one correspondence with the numbers 28 identifying each finger of the right hand 24 and the numbers 36 identifying the right hand set of keys 30 on keyboard diagram 14. Each time the student reads the number "1" above line 38, he or she knows to depress the "1" key beneath the right thumb, the "1" finger. In like manner, numbers 42 below line 38 on music sheet 10 have a one-to-one correspondence with the numbers 26 identifying each finger of the left hand 22 and the numbers 34 identifying the left hand set of keys 30 on keyboard diagram 14. This trilogy of identification between note, finger, and key with the same number, in combination with the single line 38 graphically indicating the hand required to play the note, is at the heart of the teaching method.

Numbers 40, 42 are printed from left to right on music sheet 10 in the order that the notes of the song are sung and played. Preferably, each is also printed a distance above or below line 38 which is roughly proportional to the relative position of the tone represented by the note in the chromatic scale. That is, the higher above line 38 the number is printed, the higher also will be the tone corresponding to that note. While this is the preferred printing of numbers 40, 42, as this graphically conveys the tonal flow of the music in a simple way, they can as well be simply printed horizontally in a single line and still be within the purview of the appended claims. Further, numbers 40, 42 can be spaced apart horizontally in proportion to the time value of the notes, e.g., whole notes can be spaced four times the distance apart as quarter notes. This is usually less desirable for young minds, however, as they seem to experience difficulty in following the progression from note to note, when they are variably spaced apart. It is not necessary, either, for the children are usually very familiar with the songs presented.

FIG. 4 shows a preferred variation of the materials depicted in FIGS. 1–3. The fundamentals are the same; the differences are readily apparent.

First, the placement of the diagrammatic representations of hands 12 and keyboard 14 on music sheet 10 are reversed with hands 12 uppermost. It is not critical to the invention for them to be placed in any particular arrangement on music sheet 10. Either, both, title 16, and/or words 18 can be eliminated (FIGS. 4 and 5), and the teaching method will still be effective. So long as the student appreciates that there is a trilogy of identification between the numbers assigned to his or her fingers, to the keys of the keyboard to be depressed, and to the notes printed on the music sheet, the value of the teaching method will be realized.

A second difference is in the selection of the pair of octaves on the keyboard and the concomitant hand placement on the keys as directed by keyboard diagram 14. Instead of both thumbs being placed on the C key for AWAY IN A MANGER, as in FIG. 1, the left and right thumbs are placed on the keys D and E for the song here depicted, O LITTLE TOWN OF BETHLEHEM. The difference teaches the student, in a subtle way, that different songs are usually played in different musical keys.

Third, only title 16 is given, the words of the song being absent. This variation is appropriate, when it is known with certainty that the student knows the words of the song.

Finally, in FIG. 1 the notes for AWAY IN A MANGER were all played by depressing white keys, that is, all of the notes were natural notes. This was accomplished by judicious selection of the song, based on the chromatic values of its notes, in conjunction with the selection of the musical key in which it is to be played, in this case the key of C. Most songs include notes which are sharped or flatted, however. The means of depicting sharped accidentals is shown in FIG. 4, namely, by encircling 46 both the number and a sharp symbol with a closed line. The shape of the encirclement is irrelevant and could be circular, oval (as shown), rectangular, hexagonal, etc., as the sole function of the closed line 46 is to link the two symbols, number and accidental, together. This means has been found effective with the age range of the students under consideration. The student quickly learns that to play a sharped note, one simply moves the finger indicated by the encircled number to the black key immediately to its right, as shown in diagram 14 by the white dot 48 on black key D-sharp. It should be noted in FIG. 4 that note D, i.e., number "1", played by the thumb of the left hand, is not always sharped. D-sharp is not included in the key signature; rather, it occurs only infrequently in the song. In this instance, the student would initially place all of the fingers, including the left thumb, on the white keys, and move it to the neighboring black key when so instructed by encircled note name and sharp 46.

Figure 5:
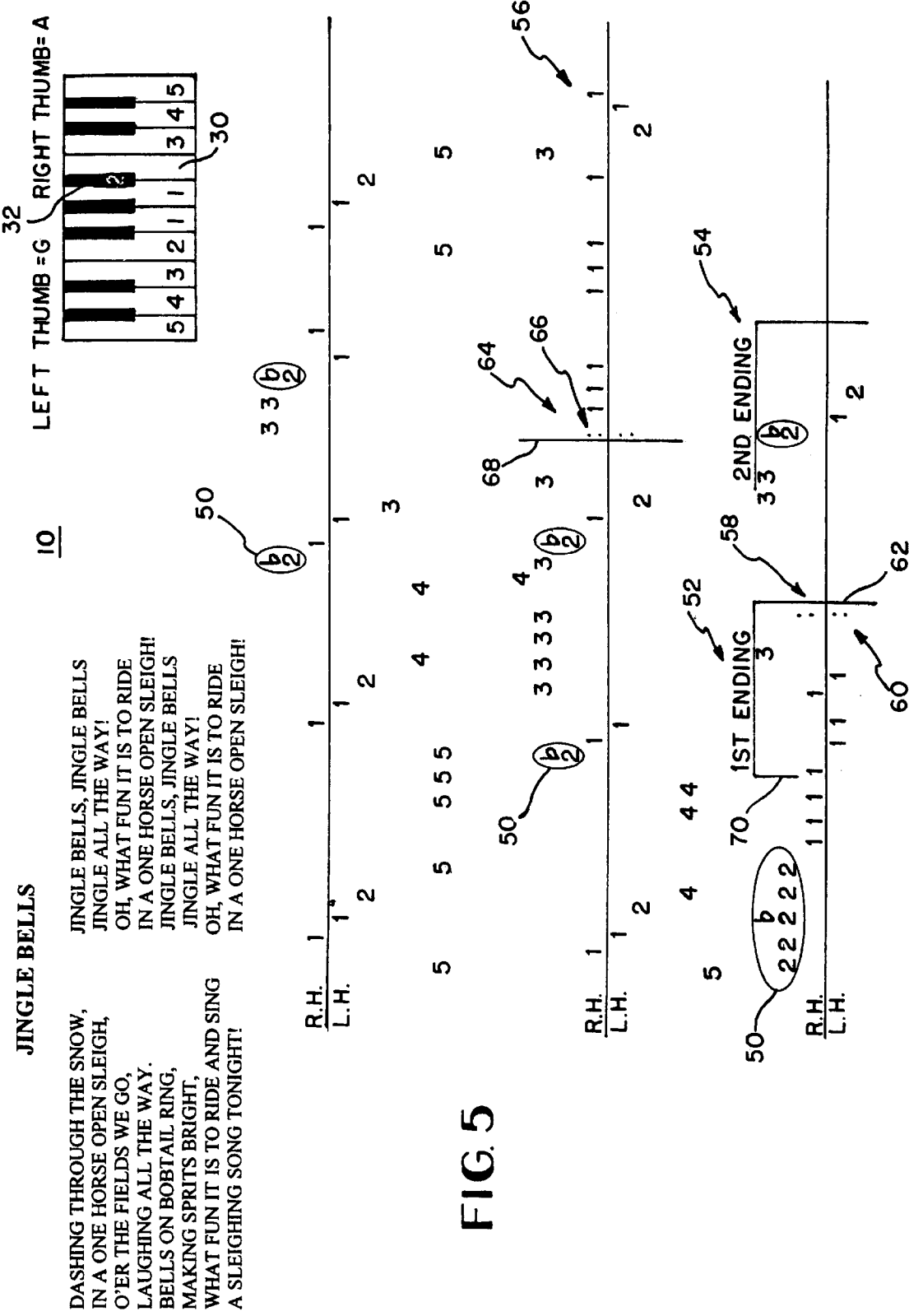

FIG. 5 shows the same system as in FIG. 4 but applied to flatted accidentals. The finger number, or groups of the same number, and the flat symbol are encircled at 50. In this case, it will be noted that all of the notes played by the second finger, the index finger, of the right hand are flatted. In conventionally printed music, when a note is always inflected in a particular musical key, the key of F-major in the case of FIG. 5, the key signature is indicated by writing a sharp or flat at the far left of each line of the musical staff in the vertical position on the staff of the note which is always inflected. Those notes thereafter appear on the staff without an adjacent sharp or flat symbol but they are played as sharped or flatted nonetheless. The concept of key signatures is too advanced for the skills of the students to whom this invention is directed. Consequently, in the preferred embodiment all inflected notes are individually sharped or flatted by encircling both the number and the appropriate sharp/flat symbol. In this instance where B-flat is the note of interest, each B-flat note name 50 assigned to the second finger of right hand 24 is encircled. The teacher has the option of instructing the student to start with the index finger of the right hand on the white key 30 for the note B or on the black key 32 for the note B-flat. The latter provides an easy introduction to the concept of key signatures to the student. Obviously, the inventive teaching method can be expanded to include printing the key signatures in the conventional manner, if desired.

FIG. 5 also shows the use of multiple endings 52 and 54. The student is thereby introduced to the practice of economy in the printing of music where segments 56 of music which are repeated during the play of the song are printed only once, and the different endings for each repetition are sequentially printed at the end of the common segment. When the student has reached the 1st ending 52, the repeat sign 58, i.e., the colon (:) 60 before the double bar 62, instructs the student to return to the closest previous repeat sign 64 comprising colon (:) 66 just after double bar 68, in order to replay the notes in the segment 56 between repeat signs 64 and 1st ending 52. When the student reaches the beginning 70 of 1st ending 52 for the second time, he or she is instructed to jump past 1st ending 52 to 2nd ending 54 and, since it has no repeat sign, to stop after playing it. This is a familiar practice to experienced students of music. Such concepts can easily be added to the music sheets 10 of the inventive teaching method as the student progresses.

Figure 6:
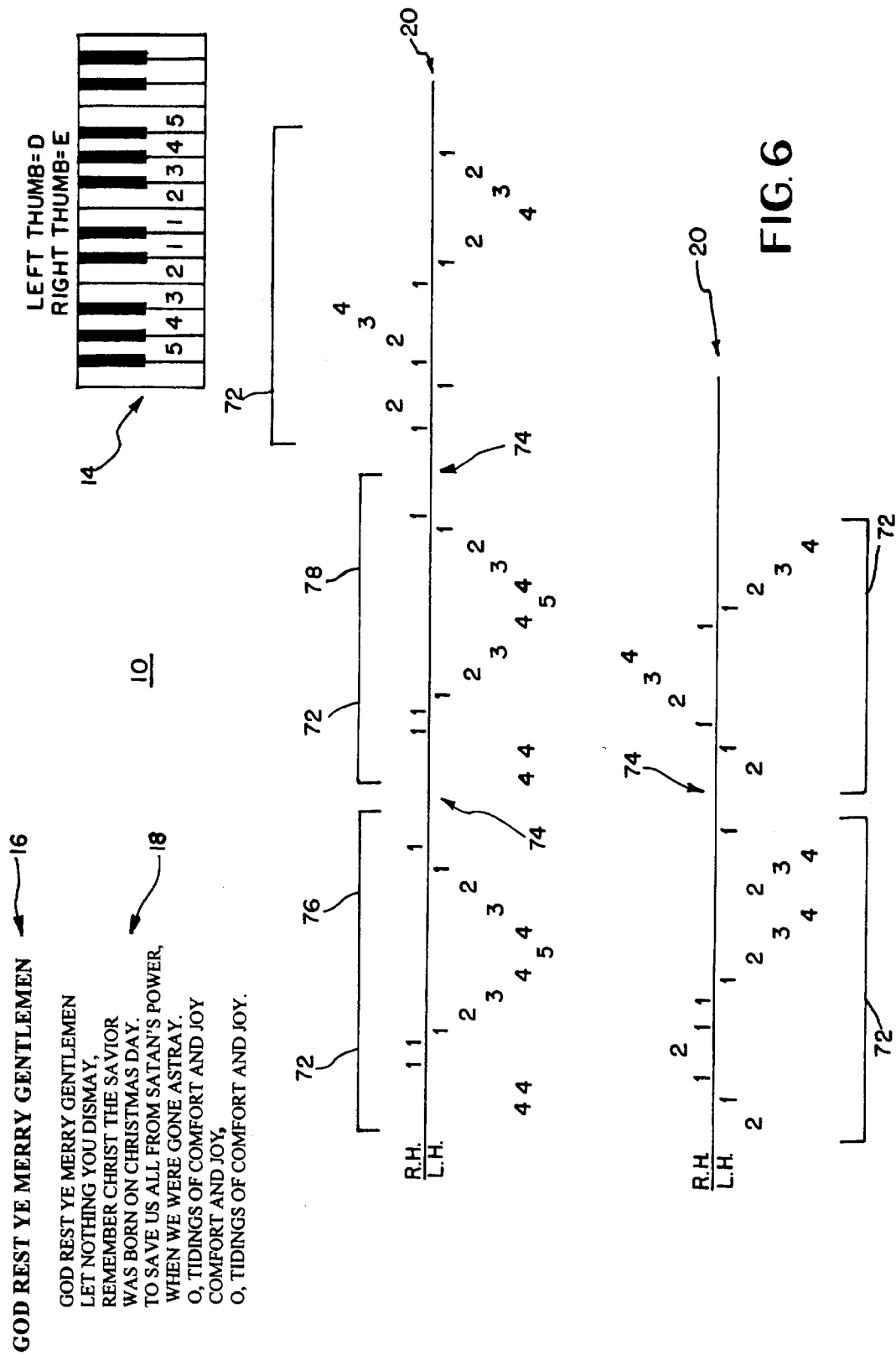
Figure 7:
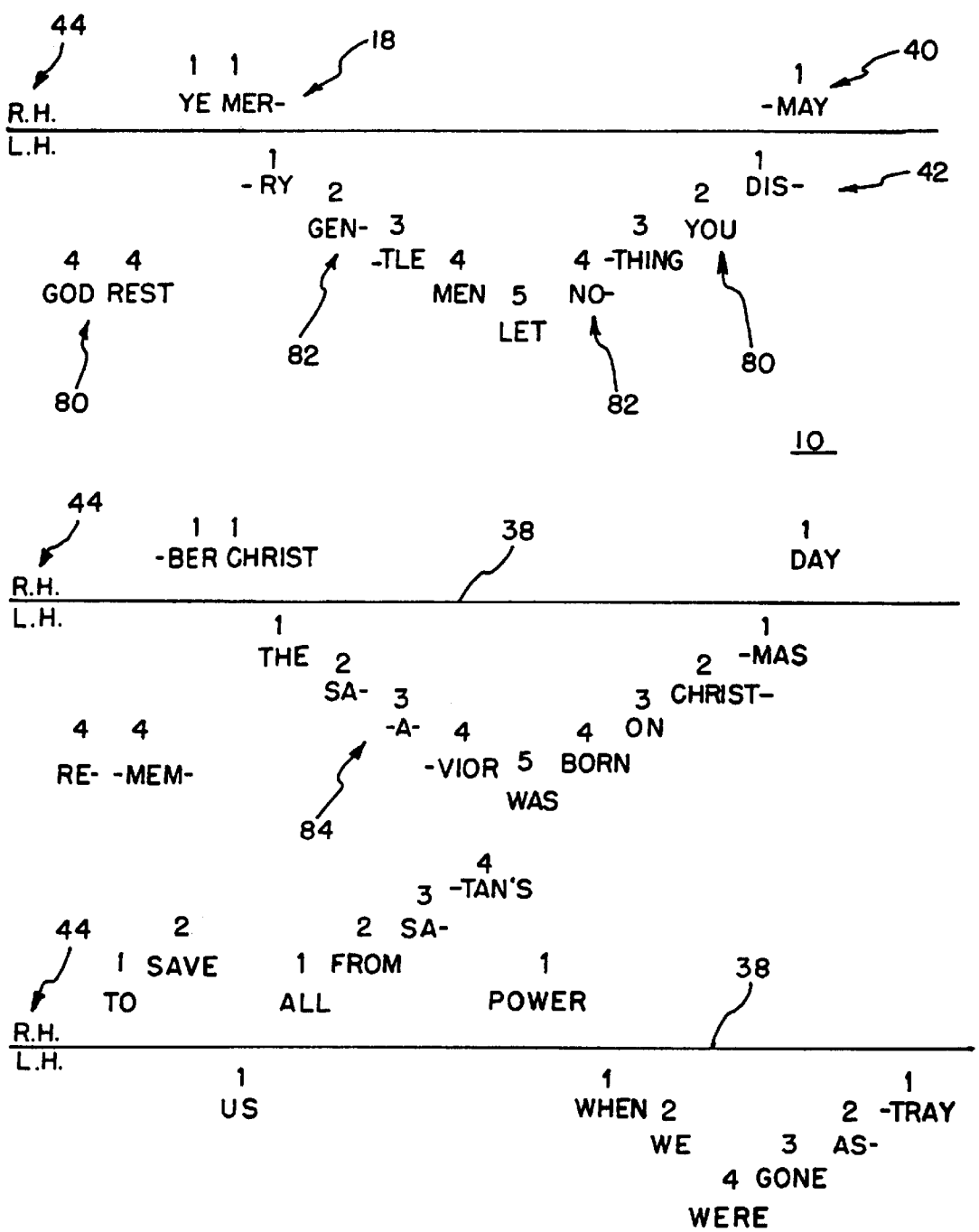

FIGS. 6–7 show variations contemplated for depicting any given song, in this case GOD REST YE MERRY GENTLEMEN. In FIG. 6, the title 16 and words 18 are printed along with keyboard diagram 14 and musical staff 20. FIG. 6 shows clearly a new concept, that of grouping musical phrases 72, and separating them by blank gaps 74, often indicating pauses. This teaches the student that music comes in phrases, some of which are often repeated, as the first two phrases 76 and 78 in FIG. 6.

FIG. 7 illustrates another teaching technique, that of printing the words 18 of the song adjacent to their note names, i.e., numbers 1–5, to teach the student the association of words and music. Each note, as shown, can be associated with entire words 80, or parts of words 82, e.g., syllables. This technique is especially useful in teaching melisma 84, i.e., the practice of associating one syllable with a plurality of notes, a musical technique derived from Gregorian chants and freely adopted by modern pop singers.

Those skilled in the art will appreciate that each of the conceptions upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims:

I claim:
1. A method of teaching music to a student, comprising the steps of:
    assigning a name to each finger of said student's hands;
    providing a keyboard;
    assigning a name to selected keys of said keyboard, said key names corresponding to said finger names such that each finger has a key assigned to it;
    providing said student with a music sheet, said music sheet comprising:
        (a) a single staff line printed transversely of said music sheet;
        (b) note names printed on said music sheet, said note names being arranged to depict the notes of a musical composition, said note names comprising the key names of the keys which when played produce the tones corresponding to said musical notes; and
        (c) the notes to be played by the fingers of the right hand being printed on one side of said staff line and the notes to be played by the fingers of the left hand being printed on the other side of said staff line;
    instructing said student to place said fingers on said keyboard with the named fingers placed on the correspondingly named keys; and
    instructing said student to play said notes with the correspondingly named fingers by depressing the correspondingly named keys.

2. The teaching method of claim 1 wherein said finger names comprise numbers assigned to said fingers of both hands as follows: 1 for the thumb, 2 for the index finger, 3 for the middle finger, 4 for the ring finger, and 5 for the little finger or pinkie.

3. The teaching method of claim 2 wherein said music sheet further comprises a diagram depicting a pair of hands with the corresponding fingers of said depicted hands having said assigned finger numbers correspondingly printed thereon.

4. The teaching method of claim 2 wherein said selected keys are white keys of said keyboard, and each of said key names is a number corresponding to the finger number of the finger assigned to the respective key.

5. The teaching method of claim 4 wherein said music sheet further comprises a pictorial representation of at least said selected keys of said keyboard with said key numbers being printed on the corresponding keys of said pictorial representation.

6. The teaching method of claim 5 wherein said pictorial representation includes at least ten consecutive white keys, each of said ten consecutive keys being sequentially printed from left to right with the finger number of the finger of both hands assigned thereto.

7. The teaching method of claim 6 wherein said pictorial representation of keyboard includes at least nine consecutive white keys and the thumbs of both hands being assigned to the central white key.

8. The teaching method of claim 4 further comprising removably affixing each of said key numbers to its corresponding white key.

9. The method of teaching a piano of claim 8 wherein said removably affixed key numbers are printed on decals removably adhered to said white keys.

10. The teaching method of claim 5 wherein said keyboard and said pictorial representation of said keyboard is a chromatic keyboard.

11. The method of teaching a piano of claim 8 wherein said removably affixed key numbers are printed on said white keys by a dry erase marker.

12. The teaching method of claim 1 wherein the note names which correspond to the fingers on the right hand are printed above said line and the note names which correspond to the fingers on the left hand are printed below said line.

13. The teaching method of claim 12 wherein said note names printed on said music sheet are sequentially printed along said line in the sequential order of the notes of said musical composition.

14. The teaching method of claim 13 wherein the vertical spacing of said note names is roughly proportional to the musical tones of said notes of said musical composition.

15. The teaching method of claim 1 further comprising printing the name of said musical composition and the words of said musical composition on said music sheet.

16. The teaching method of claim 15 wherein said music sheet further comprises individual words and syllables of words of said musical composition respectively printed adjacent the note played during the singing thereof.

17. The method of teaching a piano, comprising the steps of:

(a) providing a piano having a keyboard;

(b) providing a music sheet with a staff printed thereon, said staff comprising a single horizontal line transverse said music sheet;

(c) assigning a number to each finger of a person's hand, said finger numbers comprising thumb 1, index finger 2, middle finger 3, ring finger 4, and pinkie 5.

(d) assigning numbers to ten sequentially adjacent white keys on said keyboard of said piano, said key numbers comprising, from left to right, the numbers 5, 4, 3, 2, and 1, denoting the fingers of the left hand, and 1, 2, 3, 4, and 5, denoting the fingers of the right hand, and removably affixing said key numbers on said adjacent white keys;

(e) printing notes on said the staff sequentially from left to right in the order they are to be played in order to play a song, said staff notes comprising selected numbers from 1 to 5, wherein the notes to be played as natural notes are printed solely as numbers and the notes to be played as accidentals are printed by juxtaposing a sharp or flat by a number; and (f) printing said staff notes played by the right hand above said staff line and said staff notes played by the left hand below said staff line.

18. The method of teaching a piano of claim 17 wherein each of said accidentals are encircled by a closed line.

19. A music sheet, comprising:

a pictorial depiction of a pair of hands, each of said hands having fingers thereon, said fingers being numbered as follows: 1 for the thumb, 2 for the index finger, 3 for the middle finger, 4 for the ring finger, and 5 for the little finger or pinkie;

a diagram of a portion of a keyboard, said portion including a depiction of at least ten consecutive white keys, and said at least ten consecutive white keys having numbers sequentially printed thereon, said key numbers comprising, from left to right, the numbers 5, 4, 3, 2, and 1, denoting the fingers of the left hand, and 1, 2, 3, 4, and 5, denoting the fingers of the right hand;

a staff printed on said music sheet, said staff comprising:

(a) a single line printed transversely of said music sheet;

(b) notes sequentially printed on said music sheet to depict the sequential notes of a song, each of said notes comprising a number selected from the set 1, 2, 3, 4, and 5, said numbers simultaneously denoting both the key to be depressed to play said note and the finger to be used to depress said key; and (c) the notes with numbers corresponding to the numbers of the fingers of the right hand being printed above said staff line and the notes with numbers corresponding to the numbers of the fingers of the left hand being printed below said line.

20. The music sheet of claim 19 further comprising the title and/or words of said song being printed on said music sheet.

* * * * *